(12) United States Patent
Gómez Díaz et al.

(10) Patent No.: US 8,489,144 B2
(45) Date of Patent: Jul. 16, 2013

(54) PUSH-BUTTON TRIGGER MANAGER FOR U/SIM TOOLKIT APPLICATIONS

(75) Inventors: Esther C. Gómez Díaz, Madrid (ES); Gloria M. Salvador Pérez, Madrid (ES); Carlos Portasany Sánchez, Madrid (ES); Xavier Pons Milá, Barcelona (ES); José Jiménez Martinez, Barcelona (ES); Cármel MiróFaixes, Barcelona (ES)

(73) Assignees: Vodafone Espana, S.A., Madrid (ES); Gyd Iberica, S.A., Barcelona (ES)

( * ) Notice: Subject to any disclaimer, the term of this patent is extended or adjusted under 35 U.S.C. 154(b) by 0 days.

(21) Appl. No.: 13/270,616

(22) Filed: Oct. 11, 2011

(65) Prior Publication Data

US 2012/0225690 A1 Sep. 6, 2012

Related U.S. Application Data

(63) Continuation of application No. 13/032,113, filed on Feb. 22, 2011, now abandoned, which is a continuation of application No. 12/832,513, filed on Jul. 8, 2010, now abandoned, which is a continuation of application No. 12/516,103, filed as application No. PCT/ES2007/000678 on Nov. 23, 2007, now abandoned.

(30) Foreign Application Priority Data

Nov. 23, 2006 (ES) .................................. 200602994

(51) Int. Cl.
*H04M 1/00* (2006.01)
*H04M 3/00* (2006.01)

(52) U.S. Cl.
USPC ........................................... 455/558; 455/420

(58) Field of Classification Search
USPC ............... 455/418, 419, 420, 550.1, 557, 558
See application file for complete search history.

(56) References Cited

U.S. PATENT DOCUMENTS

| 7,715,833 B2 * | 5/2010 | Sanchez ........................ 455/419 |
| 2007/0207798 A1 * | 9/2007 | Talozi et al. .................. 455/423 |

* cited by examiner

*Primary Examiner* — Nguyen Vo
(74) *Attorney, Agent, or Firm* — B. Aaron Schulman, Esq.; Stites & Harbison, PLLC

(57) ABSTRACT

A push-button trigger manager for U/SIM Toolkit applications of a U/SIM card from a mobile terminal is provided which includes, a connection to a storage area associated to the trigger manager in order to register predetermined data related to, at least, one U/SIM Toolkit application loaded on the U/SIM card, being these predetermined data, at least, one identity of such application; manager activation to activate the trigger manager as a response to pushing a sequence of buttons and the call button in the mobile terminal, a display on the mobile terminal screen having a list of options corresponding to the U/SIM Toolkit application(s) registered in the sequence of buttons pushed by the user, and a trigger for the U/SIM Toolkit application selected by the user from the list of options.

8 Claims, 3 Drawing Sheets

| Combination of buttons | U/SIM Toolkit application data |
|---|---|
| 11 | Text 1, id 1, item No. 1 |
| 12 | Text 2, id 2, item No. 2 |
| 11 | Text 3, id 3, item No. 3 |
| 11 | Text 4 id 4, item No. 4 |

FIG. 3

MENU
---
Text 1

Text 3

Text 4

FIG. 4

MENU
---
Text 2

FIG. 5

PUSH-BUTTON TRIGGER MANAGER FOR U/SIM TOOLKIT APPLICATIONS

CROSS-REFERENCE TO RELATED APPLICATION

This application is a continuation of U.S. application Ser. No. 13/032,113, filed Feb. 22, 2011, now abandoned which is a continuation of U.S. application Ser. No. 12/832,513 filed Jul. 8, 2010, now abandoned which is a continuation of U.S. application Ser. No. 12/516,103, filed May 22, 2009, now abandoned which is a National Stage Application of International Application No. PCT/ES07/00678, filed Nov. 23, 2007, all of said applications incorporated herein by reference.

FIELD OF THE INVENTION

The present invention refers to the field of mobile telecommunications, and, more precisely, to the field of smart cards used in mobile phones with Java Card technology.

BACKGROUND OF THE INVENTION

Nowadays, mobile phones usually include a smart card comprising essential elements for the functioning of the phone. We can refer to a user's "mobile equipment" which, in the GSM system ("Global System for Mobile Communication"), in the GPRS system ("General Packet Radio Service") and in the UMTS system ("Universal Mobile Telecommunications System"—also known as "Third Generation of Mobile Telephony", comprises:
- a terminal, (which is usually defined as "mobile phone" and includes a phone case, a screen, a keyboard, a power supply unit and different circuits); and
- a smart card.

A smart card consists of an electronic device similar to a PC in its architecture, but inserted within a plastic card. Smart cards are based on an embedded system which consists of the following elements:
- CPU: Central Processing Unit. It may also consist of a cryptoprocessor.
- Volatile Memory: It is the memory unit used for temporary data storage. Usually, it is a RAM memory.
- Non-Volatile Memory: This memory stores data permanently. It is used for storage of directories, files and applications or programmes as it occurs in the hard disk of a conventional PC. Within this group, we usually refer to two types of memory:
- ROM Memory: It is indelible, and some applications necessary for the card to start are loaded thereon;
- EEPROM Memory: It can be written on and deleted, but its lifespan depends on the number of writings on it. Directories, files and some applications are stored in this memory.
- In/out unit: Element through which the card can be linked to an external device, for example to a mobile terminal, a card reader, etc.

The communication of the smart card with the different external devices is based on 5-byte commands in which the action to be fulfilled is indicated. On some occasions, the command contains necessary data to run the action, for example, updating a file in the card. On some other occasions, the card has to send data back to the device which requested the action, for example, when reading a file.

As it occurs in a PC, it is possible to install several applications of any kind in a smart card, for example:
- electronic purse applications;
- user's data management applications;
- security applications.

All the information related to the functioning and architecture of the smart cards is found in ISO standards 7816 (from part 1 to part 9).

The smart card used in a mobile phone should have a SIM application installed (if GSM/GPRS), a USIM application (if it is UMTS), or both.

The SIM ("Subscriber identity Module") application is a module or application which authenticates the user of the GSM/GPRS for the net and stores user's personal information. The USIM ("Universal Subscriber Identity Module") application fulfills the same functions as the SIM application, but for the UMTS net.

Some of its most important functions are:
- Storing the user's code, necessary for his/her univocal identification in the net. Said code is known by the name of IMSI (International Mobile Subscriber Identity).
- Executing the algorithms necessary for the user's identification in the corresponding net.
- Calculating the keys necessary to encrypt the communication.
- Arranging the PINs and their unblocking keys.
- Storing and arranging operator information.
- Storing and arranging of user information: diary, short messages etc.

All the information related to SIM application is found in the 3GPP TS 51.011 standard. Information related to U/SIM application is found in the ETSI TS 102 221 and 3GPP TS 31.102 standards.

At first, mobile terminals were only capable of sending commands to the cards, while the cards were only capable of responding to commands which came from the mobile terminal. Later, mobile terminals and cards evolved in a way that allowed both sending and receiving commands. In this way, a U/SIM application was now capable of requesting a mobile terminal to send a short message, to make a phone call etc. This functionality allows, therefore, the development of applications in the card which manage the mobile phone peripherals (display, keyboard, sending of short messages, making of phone calls, etc.) opening doors to new applications which add value to the mobile equipment.

These applications already existing in the card and capable of sending commands to the mobile terminal are known by the name of "SIM Toolkit Applications" when supported by SIM, and "USIM Toolkit Applications" when supported by U/SIM.

The high level procedures, contents, and coding of the commands are conveniently specified in the standard 3GPP TS 51.014 for SIM application and in the standards 3GPP TS 31.111 and TS 102 223 for USIM application.

The cards may be implemented using different technologies. One of the technologies the present invention can be used with is Java Card. Java Card technology allows U/SIM Toolkit applications to be remotely loaded in the card, and defines an architecture based on an element called U/SIM Toolkit Framework which controls the execution of all the U/SIM Toolkit sessions in the card.

FIG. 1 represents the functioning of the U/SIM Toolkit Framework.

U/SIM Toolkit U/SAT 1-U/SAT 4 applications start functioning when certain events are received from terminal 20, for example: "user selected an item from a list of options", "a short message has been received", "user is trying to make a phone call", etc.

When U/SAT applications are loaded on the card 10, they indicate to U/SIM Toolkit Framework 11 which events they wish to be triggered with. U/SIM Toolkit Framework receives the events from the terminal and sends the corresponding application/s. From that moment on, the U/SAT application signaled will exchange U/SIM Toolkit commands with the terminal, always controlled by U/SIM Toolkit Framework. If several U/SAT applications wish to be triggered when they receive the same event from the terminal, the U/SIM Toolkit Framework will first trigger one of them (the one with highest priority) and after this one has been triggered, the U/SIM Toolkit Framework will trigger the next one with highest priority.

From all the standard mechanisms used to trigger a U/SIM Toolkit application during the memory, we shall mention the following:

"Menu Selection" Mechanism: When the U/SAT applications are loaded on the U/SIM card, they indicate to the U/SIM Toolkit Framework that they want to be triggered by "menu", the name of the entry which shall refer to them, and another series of parameters. The U/SIM Toolkit Framework builds a list of options with the data of all the applications which want to be triggered by "menu", and requests the terminal to integrate it as menu among the ones already offered to the user. When the user selects one of the options offered in the menu, the terminal will notify the U/SIM Toolkit Framework that the corresponding U/SIM Toolkit application will be triggered.

The problem lies in the fact that the standards on U/SIM Toolkit do not specify the place in which the menu built by the smart card has to be located within the terminal tree menu. Nowadays, there are plenty of menu options offered by mobile terminals, and most of them usually locate the menus related to the cards in quite remote places which the users cannot easily find. The cards are property of the Operator and within their menus, facilities of access to the added value services are implemented, but users desist from using these services because they cannot easily find the menu in their terminal.

That is to say, the operator menu which provides access to the most usual services thereof such as news, weather forecast, draws, assistance services etc. is only accessible by means of a link provided by the terminal. This menu is built from a group of U/SIM Toolkit applications on the card, and the standard U/SIM Toolkit itself does not provide any more tools for its triggering.

"Call Control" Mechanism: When the U/SAT applications are loaded on the U/SIM card, they indicate the U/SIM Toolkit Framework that they want to be triggered every time the user starts a call, tries to send a SS or a USSD chain. When the user dials the destination numbers, the characters of SS or USSD chain, and pushes the call button, the U/SIM Toolkit Framework shall send such information to the U/SAT application, which may stop, allow, or modify the call, the SS operation or the USSD operation. From all the applications which can be loaded on the card, only one U/SAT application can be registered to this mechanism.

The use of abbreviations and acronyms is well known in the field of mobile telephony. Next, we provide a glossary of acronyms/terms which are used along the present descriptive memory:
3GPP The 3rd Generation Partnership Project
ETSI European Telecommunications Standards Institute
GPRS General Packet Radio Service
GSM Global System for Mobile Communications
IMSI International Mobile Subscriber Identity
PIN Personal Identification Number
U/SAT U/SIM Application Toolkit
U/SIM UMTS Subscriber Identification Module
SS Supplementary Service
UMTS Universal Mobile Telecommunications System
USSD Unstructured Supplementary Service Data

DESCRIPTION OF THE INVENTION

The invention refers to a push-button trigger manager for U/SIM Toolkit applications, according to claim 1. Preferred embodiments of the trigger manager are defined in the dependent claims.

The push-button trigger manager for U/SIM Toolkit applications object of the present invention solves the problem previously stated, as it provides a triggering mechanism for all the desired applications by means of pushing a combination of buttons.

One aspect of the invention refers to a U/SIM application toolkit trigger manager of a U/SIM card by pushing buttons from a mobile terminal, comprising:
  means to connect to a storage area associated to said trigger manager in order to register predetermined data related to, at least, one U/SIM Toolkit application loaded on the U/SIM card, being these predetermined data, at least, one identity of such application.
  manager activation means configured to activate the trigger manager as a response to pushing a sequence of buttons and the call button in the mobile terminal,
  means to display on the mobile terminal screen a list of options corresponding to the U/SIM Toolkit application(s) registered in the sequence of buttons pushed by the user,
  means to trigger the U/SIM Toolkit application selected by the user from the list of options.

Preferably, these predetermined data related to the U/SIM Toolkit application also include the sequence of buttons through which said application is triggered; or they can also include an identification text for such application in the list of options displayed on the screen; or the desired order appears in the list of options displayed on the screen.

That is to say, the U/SIM Toolkit application(s) that want to be triggered by the trigger manager of the present invention, when loaded on the card, add information about their identity and the way in which the triggering is produced, in a storage area linked to such trigger manager, for example, the sequence of buttons to push, text to be displayed to the user, place in the list of options shown to the user etc.

In order to trigger the manager—which can be implemented as another U/SIM Toolkit application—, the user must push a sequence of buttons and then push the call button; the terminal shall interpret that the user is trying to send an SS, USSD chain, or make a phone call and the event is transmitted triggering the manager (that is to say, the manager is triggered by means of the Call Control mechanism).

Once the manager has been triggered, if the user has pushed one of the button sequences indicated by the U/SIM Toolkit applications registered in the manager, said manager shows the user a list of options built from the texts indicated by the U/SIM Toolkit applications registered in the button sequence pushed by the user. After the user selects one of the options, the manager identifies to which U/SIM Toolkit application it belongs; the manager triggers the corresponding U/SIM Toolkit application and transfers control to it, so that U/SIM Toolkit commands can be sent to the terminal.

Preferably, the trigger manager of the invention includes means to update the register of U/SIM applications removed from the card.

Preferably, these updating means comprise:
  means to interrogate an element controlling the execution of U/SIM Toolkit sessions about U/SIM Toolkit applications; and,
  means to delete from the storage area the register of predetermined data related to the application(s) that said element controlling the execution of U/SIM Toolkit sessions indicates as removed.

For Java Card technology, said element controlling the execution of U/SIM Toolkit sessions is the U/SIM Toolkit Framework.

Preferably, every time the trigger manager of the invention is triggered because the user pushes a sequence of buttons and the call button, the trigger manager monitors all the U/SIM Toolkit applications whose triggering it controls, interrogating the element controlling the execution of U/SIM Toolkit sessions about the presence of said applications. If any of this/these application(s) has/have been removed, their information is removed from the register storage area.

The register storage area could be implemented as an integral part of the trigger manager itself.

Thus, the invention provides an alternative trigger mechanism for all those applications which are usually triggered by "menu selection", with the following characteristics:
  the user may activate the trigger in a simple way;
  a list of options are shown to the user, each of them triggering a U/SIM Toolkit application in a way similar to the "menu selection" mechanism;
  the list of options can be updated if the related applications are removed from the card;
  new applications loaded on the card can be registered to the event.

The invention also refers to a mobile telephone system which includes a trigger manager for U/SIM Toolkit applications according to what has been previously described.

The invention described establishes an almost-direct communication channel between the user and the U/SIM Toolkit applications on the card, by pushing combinations of buttons.

BRIEF DESCRIPTION OF THE DRAWINGS

The following is a brief description of a series of drawings which will help understand the invention better, relating clearly to an embodiment of said invention which is presented as a non-limiting example thereof.

FIG. 3 represents an example of some information which may possibly be included in the register storage area.

FIG. 4 represents a list of options from the menu displayed to the user, according to a possible sequence of buttons pushed in the example of FIG. 3.

FIG. 5 represents a list of options from the menu displayed to the user, according to another possible sequence of buttons pushed in the example of FIG. 3.

PREFERRED EMBODIMENT OF THE INVENTION

Next, we describe a preferred embodiment of the invention, implemented in Java Cards. In this case, the mobile terminal must support the SIM Toolkit Call Control mechanism included in the standard 3GPP TS 51.014 for SIM application and 3GPP TS 31.111 and TS 102223 for U/SIM application.

Figure 1:
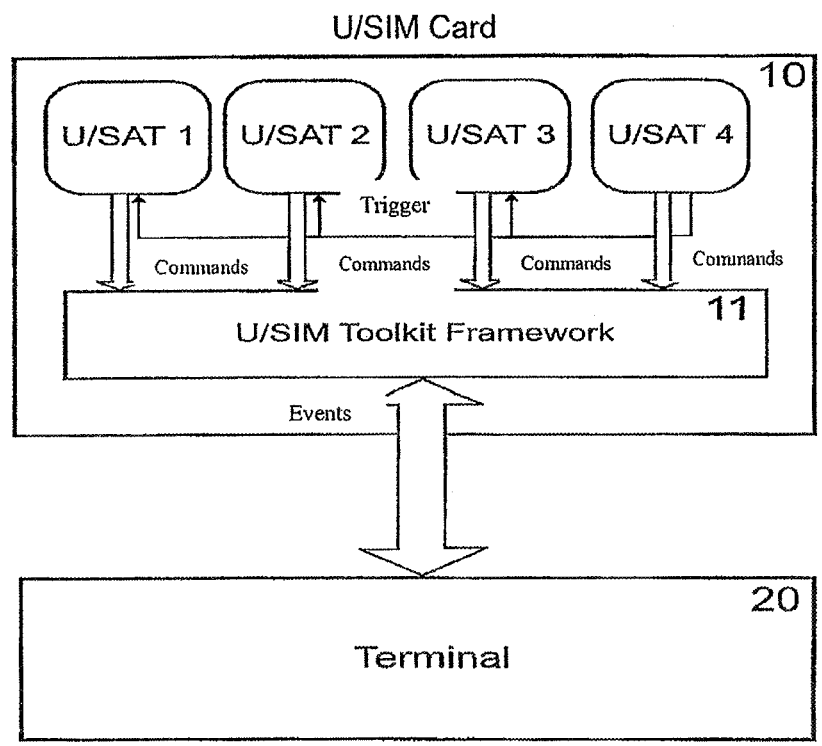
FIG. 1 represents the functioning (already known) of the U/SIM Toolkit Framework.
Figure 2:
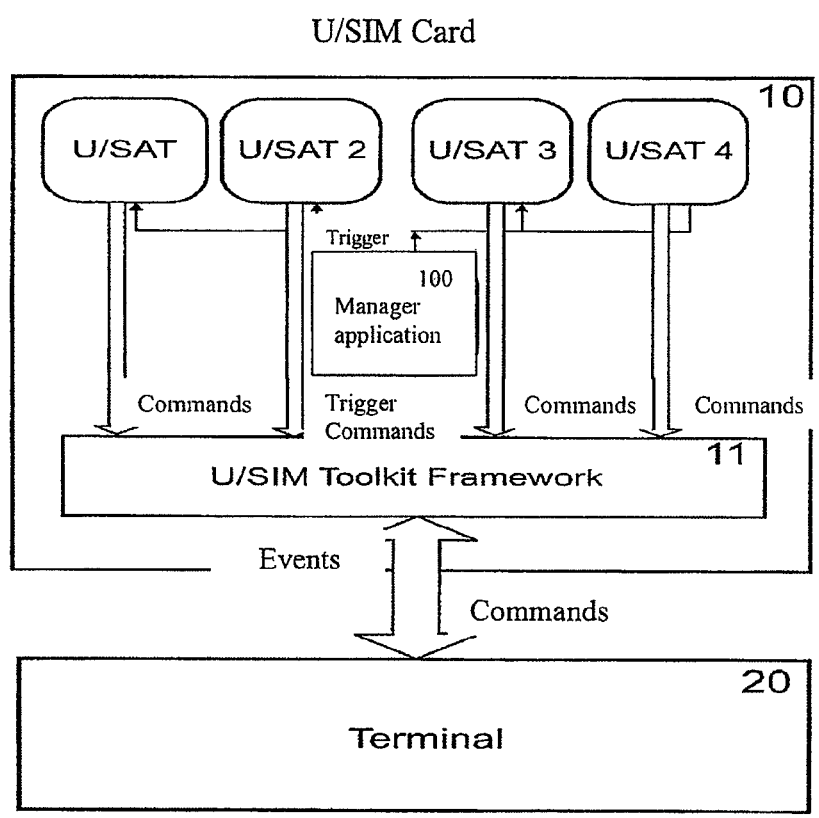
FIG. 2 represents the functioning of the trigger manager for U/SIM Toolkit applications according to an example of a possible use of the invention.

FIG. 2 represents the functioning of the trigger manager for U/SIM Toolkit applications. In this case, the U/SIM Toolkit U/SAT 1-U/SAT 4 applications loaded on the terminal are triggered by means of the trigger manager 100. These applications are registered into the trigger manager 100 when loaded on the card, disclosing the combination of buttons with which they are to be triggered.

For example, four U/SIM Toolkit applications are loaded on a card 10. The first of the applications is registered into the trigger manager 100, indicating it wishes to be triggered when the user pushes the combination of buttons "11", identified by the text "Text 1", and take the first position in the list of options; the second application chooses the combination of buttons "12", to be identified by the text "Text 2", and take the first position in the list of options; the third application chooses the combination "11", like the fist application, to be identified by the text "Text 3", and take the second position in the list of options; and the fourth application chooses the combination "11", like the first and third applications, to be identified by the text "Text 4", and take the third position in the list of options. The trigger has mechanisms necessary to solve conflicts if two or more U/SIM Toolkit applications are registered in the trigger, indicating that they want to take the same position in the list of options to which they will belong.

FIG. 3 represents the information which may possibly be included in the register storage area according to the example previously described.

When the user pushes the combination "11" plus the call button on the terminal keyboard, the trigger manager shall display the possible options in a menu, as shown in FIG. 4.

When the user pushes the combination "12" plus the call button on the terminal keyboard, the trigger manager shall display the possible options in a menu shown in FIG. 5.

In this way, in order to make the operator menu more accessible (for example, the Vodafone menu), the trigger manager of the invention is given all the applets comprising the operator menu, in such a way that they are triggered when the user pushes, for example, the combination of buttons "22". Therefore, when the user pushes "22" plus the call button on their terminal a menu with the same options as the Vodafone menu will be displayed: News, Currencies, Sports, . . . .

Or also, you may, for example, register into the trigger manager the combination of buttons "23", a SIM Toolkit applet which enables to manage the phone book of the (U) SIM card.

What is claimed is:

1. Push-button trigger manager (100) for U/SIM Toolkit applications of a U/SIM (10) card from a mobile terminal, comprising:
  means to connect to a storage area associated to said trigger manager in order to register predetermined data related to, at least, one U/SIM Toolkit application loaded on the U/SIM card, being these predetermined data, at least, one identity of such application,
  manager activation means configured to activate the trigger manager as a response to pushing a sequence of buttons and the call button in the mobile terminal,
  means to display on the mobile terminal screen a list of options corresponding to the U/SIM Toolkit application(s) registered in the sequence of buttons pushed by the user,
  means to trigger the U/SIM Toolkit application selected by the user from the list of options.

2. Trigger manager according to claim 1, characterized in that said predetermined data related to the U/SIM Toolkit application also include the sequence of buttons through which said application is triggered.

3. Trigger manager according to claim 1, characterized in that said predetermined data related to U/SIM Toolkit application also include an identification text for said application in the list of options displayed on the screen.

4. Trigger manager according to claim 1, characterized in that said predetermined data related to U/SIM Toolkit application also include the desired order in which they are to appear on the list of options displayed on the screen.

5. Trigger manager according to claim 1, characterized in that it also comprises:
   means to update the register of U/SIM applications removed from the card.

6. Trigger manager according to claim 5, characterized in that said updating means comprise:
   means to interrogate an element which controls the execution of U/SIM Toolkit sessions about U/SIM Toolkit applications; and,
   means to delete from the storage area the register of predetermined data related to the application(s) that said element controlling the execution of U/SIM Toolkit sessions indicates as removed.

7. Trigger manager according to claim 1, characterized in that said "storage area" is part of the trigger manager itself.

8. Mobile telephone system including a trigger manager (100) for U/SIM Toolkit applications according to claim 1.

* * * * *